US008032530B2

(12) United States Patent
Girnus et al.

(10) Patent No.: US 8,032,530 B2
(45) Date of Patent: Oct. 4, 2011

(54) METHOD AND DEVICE FOR PROCESSING RELEVANT DATA FOR SORTING POSTAL ITEMS

(75) Inventors: Malte Girnus, Darmstadt (DE); Michael Harbaum, Darmstadt (DE); Michael Dressler, Langenlonsheim (DE)

(73) Assignee: Deutsche Post AG, Bonn (DE)

( * ) Notice: Subject to any disclaimer, the term of this patent is extended or adjusted under 35 U.S.C. 154(b) by 313 days.

(21) Appl. No.: 12/095,980

(22) PCT Filed: Dec. 4, 2006

(86) PCT No.: PCT/EP2006/011593

§ 371 (c)(1), (2), (4) Date: Jun. 3, 2008

(87) PCT Pub. No.: WO2007/065616

PCT Pub. Date: Jun. 14, 2007

(65) Prior Publication Data

US 2008/0251430 A1 Oct. 16, 2008

(30) Foreign Application Priority Data

Dec. 5, 2005 (EP) .................................... 05026477

(51) Int. Cl.
*G06F 7/00* (2006.01)
*G06F 17/30* (2006.01)

(52) U.S. Cl. ......................... 707/736; 707/752; 707/758

(58) Field of Classification Search ........................ None
See application file for complete search history.

(56) References Cited

U.S. PATENT DOCUMENTS

2003/0182018 A1 9/2003 Snapp
2004/0153470 A1 8/2004 McLintock
2004/0220888 A1 11/2004 O'Martin et al.

OTHER PUBLICATIONS

PCT International Preliminary Report on Patentability, International Application No. PCT/EP2006/011593, International Filing Date Dec. 4, 2006, Translation.

*Primary Examiner* — Jay Morrison
(74) *Attorney, Agent, or Firm* — International IP Law Group, P.C.

(57) ABSTRACT

There is provided a method and system for sorting mailpieces in which data objects that are relevant for the sorting of the mailpieces are processed, and a result of the processing of a data object in a first data processing system is transmitted to a second data processing system for further processing. An exemplary method comprises providing in the first and second data processing systems a definition list that contains associations between the data objects and an unambiguous identifier and in which attributes of the data objects are indicated, whereby the unambiguous identifier of the data object is contained in the result of the processing of the data object, and whereby the second data processing system ascertains the attributes of the data object on the basis of the definition list and carries out the further processing of the result of the processing of the data object in the first data processing system on the basis of the ascertained attributes.

18 Claims, 3 Drawing Sheets

METHOD AND DEVICE FOR PROCESSING RELEVANT DATA FOR SORTING POSTAL ITEMS

CROSS REFERENCE TO RELATED APPLICATIONS

Pursuant to 35 U.S.C. §371, this application is the United States National Stage Application of International Patent Application No. PCT/EP2006/011593, filed on Dec. 4, 2006, the contents of which are incorporated by reference as if set forth in their entirety herein, which claims priority to EP Patent Application No. 05026477.9, filed Dec. 5, 2005, the contents of which are incorporated by reference as if set forth in their entirety herein.

BACKGROUND

Exemplary embodiments of the present invention relate to a method for sorting mailpieces in which data objects that are relevant for the sorting of the mailpieces are generated and/or processed, whereby a result of the processing of a data object in a first data processing system is transmitted to a second data processing system for further processing.

Exemplary embodiments of the present invention also relate to a device that is suitable for carrying out the method.

Mailpieces mailed in a certain region are normally collected in a distribution center of a postal service provider and distributed among the destination regions within the scope of the so-called outgoing sorting. In the distribution centers of the destination region, a fine sorting is then normally carried out in which the mailpieces are distributed among the delivery depots. Moreover, as a rule, sorting according to the sequence of the delivery route is also carried out. Here, the sorting of the mailpieces is done on the basis of sorting data that contains the association of mailpieces with the sorting compartments of a sorting machine. In order to generate the sorting data, with an eye towards the capacity of the available sorting machines, it is necessary to know the expected mail volume, which is usually ascertained on the basis of the mail volume accumulated during preceding sorting procedures.

The generation of the sorting data and the evaluation of the mail volumes accumulated during the sorting are very complex processes in which, as a rule, several different data processing systems are used.

Normally, several systems are provided in which sorting destinations are set up and maintained. Typically, the term sorting destinations, in addition to referring to delivery addresses, also refers to delivery districts in which the delivery points serviced by a single mail carrier are combined, as well as to additional sorting-relevant groupings of delivery addresses and delivery districts.

The information about the existing sorting destinations is transmitted to systems that generate the sorting data for the outgoing sorting and for the incoming sorting, taking the expected mail volume into account. The sorting plans are then transmitted to the appertaining distribution centers, where they are loaded into the sorting machines in the form of sorting programs.

Moreover, sorting data is transmitted to data processing systems that detect and evaluate mail volumes accumulated during the sorting so that production planning can be carried out as a function of the accumulated mail volumes. As a rule, in addition to the sorting data, these systems require not only the sorting data but also information about the existing sorting destinations on the basis of which the sorting plans are generated.

In the state of the art, this information is transmitted from the systems that are provided for generating and maintaining this information, via the data processing systems that are provided for generating the sorting plans, to the systems that perform the evaluation of the mail volumes accumulated during the sorting.

This entails the disadvantage that, in addition the sorting data, the information about the sorting destinations also has to be compiled by the in-between system for generating the sorting plans so that it can be made available for transmission to the evaluation system, and for this purpose, special functionalities and interfaces have to be made available. Moreover, the problem exists that the information about the sorting destinations has to be linked in a suitable manner to the sorting data in order to ensure a smooth automatic further processing of the sorting data in the systems for evaluating the accumulated mail volumes.

Another drawback of the approach according to the state of the art is especially the fact that, due to the consecutive transmission of the information via various data processing systems, data inconsistencies or data distortions and data losses can occur that especially impair the evaluation of the mail volume on the basis of the sorting data and on the basis of the transmitted information about the sorting destinations.

Moreover, it is disadvantageous that the information about the sorting destinations taken into account in the sorting data only becomes available in the systems that further process the sorting data once the processing has been completed in the upstream system for generating the sorting data and once the information has been transmitted.

SUMMARY OF THE INVENTION

It is the objective of the present invention to make the generation of sorting data as well as the evaluation of sorting data more efficient and to ensure a higher level of data security.

Accordingly, it is provided that a method of the above-mentioned type is carried out in such a manner that, in the data processing systems, a definition list is available that contains associations between the data objects and an unambiguous identifier and in which attributes of the data objects are indicated, whereby the unambiguous identifier of the data object is contained in the result of the processing of the data object, whereby the second data processing system ascertains the attributes of the data object on the basis of the definition list and carries out the further processing of the result of the processing of the data objects in the first data processing system on the basis of the ascertained attributes.

The device for sorting mailpieces, in which data objects that are relevant for the sorting of mailpieces can be processed in several data processing systems, and a result of the processing of a data object in a first data processing system can be transmitted to a second data processing system for further processing, is characterized in that, in the data processing systems, a definition list is available that contains associations between the data objects and an unambiguous identifier and in which attributes of the data objects are indicated, whereby the unambiguous identifier of the data object is contained in the result of the processing of the data object, and the attributes of the data object can be ascertained in the second data processing system on the basis of the definition list and the further processing of the result of the processing of the data object can be carried out in the first data processing system on the basis of the ascertained attributes.

Consequently, an exemplary embodiment of the present invention associates a data object with an unambiguous identifier and the association between the data object or its attributes and the identifier is stored in a definition list. When a data object is processed in a first data processing system, only the identifier is incorporated into the processing result. When this processing result is further processed in a second data processing system, the attributes of the data object that are pertinent for the further processing are ascertained on the basis of the identifier from the definition list.

In this manner, it is achieved that the attributes of the data object required for the further processing do not have to be transmitted from the first to the second data processing system. This is advantageous especially if the further processing takes place in the second data processing system on the basis of attributes of the data object that differ from those in the processing in the first data processing system since, in this case, no attributes that are not relevant for the first data processing system have to be transmitted from the first data processing system to the second data processing system.

Moreover, on the basis of the definition list, a uniform data stock is ensured and it is prevented that data inconsistencies occur as a result of the compilation of data objects in the first data processing system and the transmission of this compilation to the second data processing system.

Therefore, the drawbacks of the state of the art are overcome by exemplary embodiments of the present invention.

Within the scope of an exemplary embodiment of the present invention, the term data processing system is to be understood in its broadest sense and it especially comprises data processing systems that contain one single data processing installation as well as data processing systems that have a plurality of data processing installations. In particular, a certain task is assigned to a data processing system such as, for example, the generation of sorting lists for sorting mailpieces or the evaluation of the mail volume accumulated during the sorting of the mailpieces.

In a preferred embodiment of the method according to of an exemplary embodiment of the present invention and of the device according to an exemplary embodiment of the present invention, it is provided that each data object is associated with a data processing system with versioning autarchy in which the definition list with the association between the data object and the identifier is generated.

This ensures that the definition lists are generated by a predetermined data processing system.

Another preferred embodiment of the method according to an exemplary embodiment of the present invention and of the device according to an exemplary embodiment of the present invention is characterized in that the data processing system with versioning autarchy makes the definition list available to other data processing systems.

In an advantageous refinement of the method according to an exemplary embodiment of the present invention and of the device according to an exemplary embodiment of the present invention, the data processing system with versioning autarchy generates a further definition list when the attributes of at least one data object change and it makes this definition list available to other data processing systems.

In this manner, if there are changes within the data stock, a definition list that is adapted to the changes of the attributes of the data objects can be generated and made available to the other data processing systems.

In a likewise advantageous refinement of the method according to an exemplary embodiment of the present invention and of the device according to an exemplary embodiment of the present invention, it is provided that, in the data processing system with versioning autarchy, an updated definition list is generated at regular time intervals and this definition list is made available to other data processing systems.

In an exemplary embodiment of the method according to an exemplary embodiment of the present invention and of the device according to an exemplary embodiment of the present invention, it is provided that the definition list is provided with a version identifier that is unambiguously associated with it.

As a result, it is achieved that definition lists generated at different points in time can be distinguished from each other in a simple manner.

An advantageous refinement of the method according to an exemplary embodiment of the present invention and of the device according to an exemplary embodiment of the present invention may be characterized in that the version identifier is contained in the result of the processing of the data object in the first data processing system.

Therefore, during the processing of the data object, the attributes indicated in a certain definition list can be taken as the basis and, during the further processing of the processing result, the pertinent definition list can be ascertained.

Furthermore, an advantageous refinement of the method according to an exemplary embodiment of the present invention and of the device according to an exemplary embodiment of the present invention is characterized in that the second data processing system ascertains the definition list from a plurality of definition lists on the basis of the version identifier.

Moreover, in a preferred embodiment of the method according to an exemplary embodiment of the present invention and of the device according to an exemplary embodiment of the present invention, it is provided that the definition list is sent from the data processing system with versioning autarchy to the other data processing systems.

A likewise preferable embodiment of the method according to an exemplary embodiment of the present invention and of the device according to an exemplary embodiment of the present invention is characterized in that the other data processing systems request at least part of the definition list from the data processing system with versioning autarchy.

In a preferred refinement of the method according to an exemplary embodiment of the present invention and of the device according to an exemplary embodiment of the present invention, it is provided that the second data processing system requests the attributes of the data object contained in the definition list from the data processing system with versioning autarchy, whereby the second data processing system transmits the identifier contained in the result of the processing of the data object in the first data processing system to the data processing system with versioning autarchy.

In this refinement, the definition lists do not have to be stored in the data processing systems but rather, the attributes needed for the further processing of a result of the processing of a data object can be requested from the data processing system with versioning autarchy indicating the identifier contained in the result.

This exemplary embodiment has the advantage that, if needed, the definition list can be requested from a data processing system, for example, if said system receives the processing result of a data object from another data processing system in order to further process it.

Moreover, an advantageous refinement of the method according to an exemplary embodiment of the present invention and of the device according to an exemplary embodiment of the present invention may be characterized in that each data object is associated with a data processing system with maintenance autarchy, in which the data object as well as the identifier of the data object are generated and in which the appertaining attributes are associated with the data object.

An advantageous refinement of the method according to an exemplary embodiment of the present invention and of the device according to an exemplary embodiment of the present invention provides that the data processing system with maintenance autarchy and the data processing system with versioning autarchy are identical.

In a likewise advantageous refinement of the method according to an exemplary embodiment of the present invention and of the device according to an exemplary embodiment of the present invention, it may be provided that the data processing system with maintenance autarchy transmits the data objects along with their associated identifier to the data processing system with versioning autarchy.

In this refinement of an exemplary embodiment of the present invention, the data processing system with maintenance autarchy and the data processing system with versioning autarchy may be two different systems. This may be especially advantageous if the data objects maintained in one data processing system are checked in another system.

Therefore, an especially advantageous method according to an exemplary embodiment of the present invention and of the device according to an exemplary embodiment of the present invention may be characterized in that the data processing system with versioning autarchy checks the data object and in that the definition list is generated after having successfully checked the data object.

In this manner, it is achieved that the definition list may be generated on the basis of the checked data objects.

Moreover, in an advantageous refinement of the method according to an exemplary embodiment of the present invention and of the device according to an exemplary embodiment of the present invention, it is provided that information carrier data may be generated in the first data processing system on the basis of data objects that are indicated in a definition list and that describe transportation destinations, the information carrier data containing an association between a sorting compartment of a sorting machine and an identifier that is associated with a transportation destination on the basis of the definition list.

Another advantageous refinement of the method according to an exemplary embodiment of the present invention and of the device according to an exemplary embodiment of the present invention that, in the second data processing system, the number of mailpieces that are taken to the transportation destination is ascertained, whereby an indication of the number of mailpieces sorted into the sorting compartment by the sorting machine is made available to the second data processing system and whereby the second data processing system ascertains the transportation destination on the basis of the information carrier data and the definition list.

Advantageously, it may be provided that the second data processing system ascertains the transportation destination in that, on the basis of the definition list, the transportation destination that is associated with the identifier contained in the information carrier data is ascertained.

DETAILED DESCRIPTION OF SPECIFIC EMBODIMENTS

Figure 1:
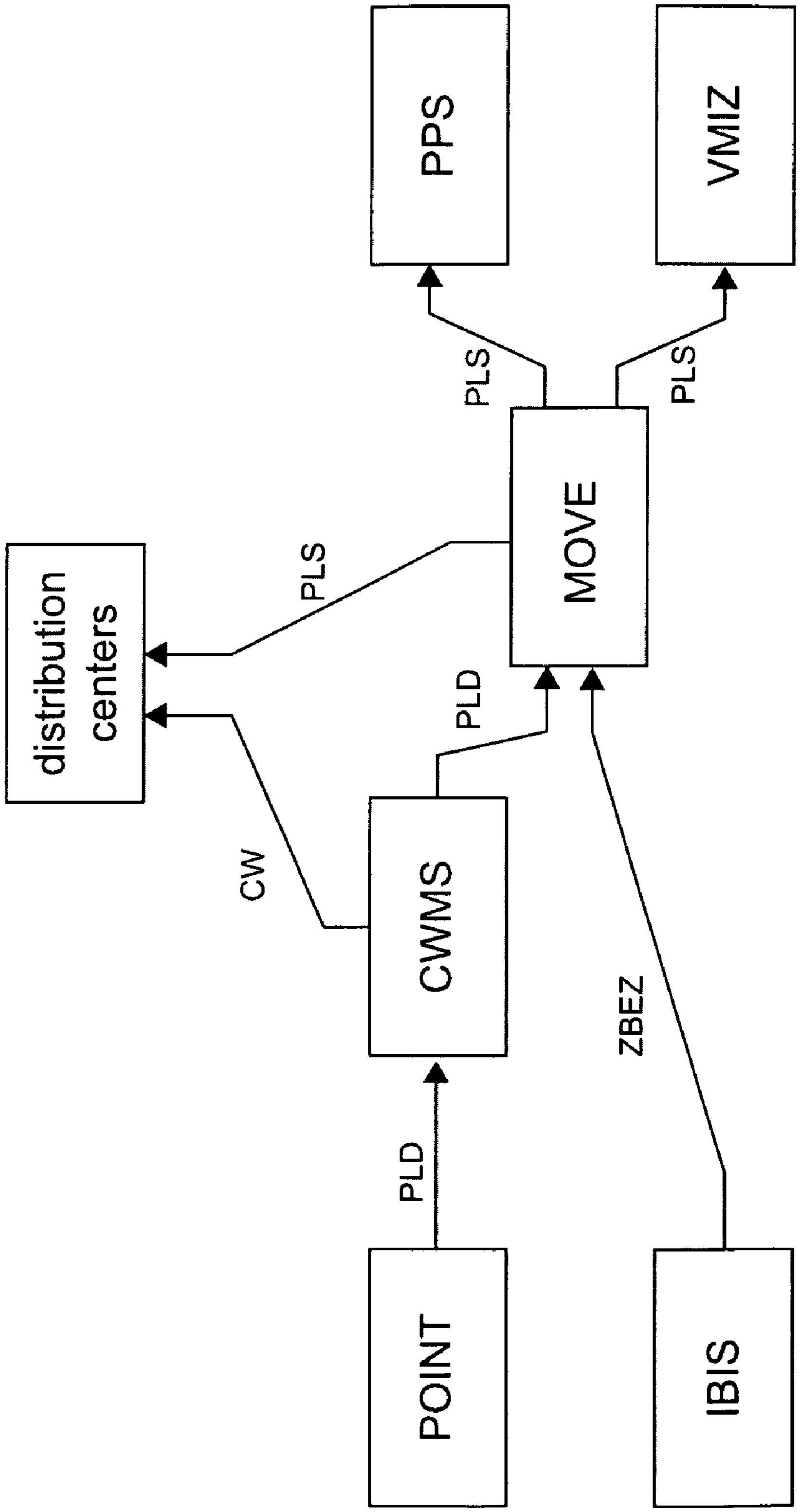
FIG. 1 is a diagram showing systems for making data available that is relevant for the sorting of mailpieces as well as for evaluating the mail volume accumulated during the sorting in accordance with an exemplary embodiment of the present invention.

The sorting of mailpieces, as already explained above, normally takes place within the scope of a method having at least two stages comprising the outgoing sorting in a distribution center of a postal service provider associated with the region of origin of the mailpiece, and comprising the incoming sorting in a distribution center associated with the destination region of the mailpiece. During the outgoing sorting, the mailpieces that have arrived are distributed especially among the destination regions and taken to the distribution centers of the destination regions after the outgoing sorting has been completed. There, a fine sorting of the mailpieces is then carried out during which the mailpieces are distributed among the delivery districts within the destination region and normally also sorted according to the sequence of the delivery routes in the individual delivery districts.

The outgoing sorting presorts the mailpieces for the so-called machine incoming feeds during the incoming sorting. The machine incoming feeds are sorting destinations under which the destinations are combined for which mailpieces are sorted together in a sorting machine during the incoming sorting. A machine incoming feed comprises, for example, mailpieces for several delivery districts that are sorted together in a sorting machine according to the sequence of the delivery route in which the mail carriers deliver the mailpieces in the delivery districts.

The distribution centers normally have an encoding device which recognizes the delivery address applied onto a mailpiece or the information about the street, the house number as well as the postal code and the town contained in the delivery address and converts this information into a numerical sorting code. The recognition is first carried out automatically in an OCR device (OCR: Optical Character Recognition) and—if the delivery address could not be recognized here—in a video encoding device where an image of the mailpiece surface containing the delivery address is displayed on a monitor to a video encoding employee. He or she deciphers the delivery address and enters it into an entry means, after which the address is converted into the sorting code. The sorting code is applied in machine-readable form, normally as a barcode, onto the mailpieces.

Within the sorting machines, the sorting code applied onto the mailpieces is first read in by means of a scanner. Then, on the basis of the sorting plan stored in the sorting machine, it is ascertained into which sorting compartment the mailpiece has to be diverted on the basis of its sorting code. Subsequently, the mailpiece is conveyed to the sorting compartment and diverted there. The sorting list contains the associations between the sorting codes and the sorting compartments of the sorting machine into which mailpieces are to be diverted on the basis of the associated sorting code.

In order to indicate the transportation destinations of the mailpieces that are diverted into the individual sorting compartments of the sorting machine, a so-called information carrier is printed out for each sorting compartment and, in addition to indicating the distribution center in which the mailpieces have been sorted, this information carrier also indicates the transportation destination and it is applied onto a container into which the mailpieces from a sorting compartment are placed in order to be further transported. For example, the distribution center of the destination region of the mailpieces as well as the machine incoming feed for which the mailpieces within this distribution center are intended are indicated as transportation destinations of mailpieces that were sorted during the outgoing sorting. Transportation destinations of mailpieces that were processed in the incoming sorting are, for example, a certain delivery depot or a bulk-mail recipient for which the mailpieces are intended.

For the production planning, it is provided that the mail volumes accumulated during the sorting are recorded and evaluated, as will be explained in greater detail below.

By way of an example, in FIG. 1, various data processing systems are shown which are provided for the management of sorting destinations, for generating sorting lists and information carrier data as well as for evaluating the mail volumes accumulated during the sorting.

The POINT system shown in FIG. 1 is a central system, i.e. a system that manages data for all of the sites of the postal service provider. Postal routing data (PLD) is generated and maintained in the POINT system. This data especially comprises street addresses and post office box addresses as well as bulk-mail recipient addresses with their associated attributes, each address representing a data object maintained in the POINT system.

The attributes associated with these data objects can, in turn, be data objects that are generated and maintained within the scope of the POINT system and with which, in turn, additional attributes are associated.

A street address describes a delivery point to which mailpieces are delivered by the postal service provider. It is associated especially with the following attributes:

a house number, the street where the street address is located, the street section where the street address within a street is located, the postal code associated with the street address, and the town where the street address is located.

A post office box is a compartment that is normally located in a branch office of the postal service provider and that can be rented by a customer of the postal service provider. Mailpieces for these customers that are addressed with the post office box address—i.e. the town where the post office box is located, a post office box postal code and a post office box number associated with the post office box—are not delivered to the customer at a street address but rather are placed into the post office box. Within the POINT system, a post office box is associated especially with the following attributes:

the customer who owns or rents the post office box, a postal code that is associated with the post office box address, the post office box number, an identification of a post office box cabinet that comprises several post office boxes and in which the post office box is located, as well as the town in which the post office box is located.

Bulk-mail recipients are customers of the postal service provider that regularly receive a large number of mailpieces and consequently do not receive their mail from a mail carrier on his delivery route or via a post office box, but rather who receive their mail directly from a distribution center of the postal service provider. A bulk-mail recipient can be identified on the basis of a bulk-mail recipient postal code that is also contained in the delivery address of mailpieces that are addressed to this recipient. Within the POINT system, a bulk-mail recipient is especially associated with the following attributes:

name and address of the bulk-mail recipient, the bulk-mail recipient postal code a sorting code that is associated with the mailpieces that are addressed to the bulk-mail recipient and that is used during the sorting of the mailpieces.

Moreover, mailpieces can be addressed on the basis of so-called mailing campaign postal codes. A mailing campaign postal code is issued by the postal service provider if a recipient receives a very large number of mailpieces within a limited period of time because of a mailing campaign such as, for example, sweepstakes. As is the case with mailpieces that are addressed with a bulk-mail recipient postal code, the mailpieces that are addressed with a mailing campaign postal code are delivered to the recipient directly from a distribution center of the postal service provider. Within the POINT system, a mailing campaign postal code is associated with attributes, especially the name and the address of the recipient.

As already mentioned, several of the mentioned attributes of the described data objects are, in turn, data objects that are generated and maintained in the POINT system and that are an integral part of the postal routing data (PLD).

The street section is a data object that, in the POINT system, is being associated with attributes, namely, the appertaining street, the appertaining town as well as the house number range that defines the street section. Moreover, each street section is associated with a sorting code that is used during the sorting of the mailpieces.

A street, in turn, is a data object that is maintained in the POINT system. A street is associated with attributes, especially the street name as well as the town where the street is located. Additional attributes are different spellings for a street that are associated with this street so that the street can be encoded for the sorting of the mailpieces, even if the spellings differ.

The postal code as used by the applicant is a five-digit number that is associated with a delivery district group, which is described below. It is likewise a data object that is maintained in the POINT system and that is especially associated with attributes, namely, a postal code type as well as the distribution center where the incoming sorting of the mailpieces addressed with the postal code is carried out. On the basis of the type of postal code, a distinction is made as to whether the postal code is a mailing campaign postal code, a bulk-mail recipient postal code, a delivery postal code, a post office box postal code or a combination postal code. Multiple street addresses that receive their mail deliveries from one mail carrier are combined under one delivery postal code. A combination postal code is a postal code that is associated with multiple street addresses as well as with multiple post office boxes.

The postal routing data (PLD) maintained in the POINT system is transmitted to the CWMS system that is provided for generating encoding dictionaries. The transmission is preferably carried out at regular time intervals in the form of database views that are first stored in the CWMS system.

After the postal routing data (PLD) has been received, first of all, the postal routing data (PLD) is edited on the basis of a relational database model within the CWMS system. Subsequently, the received postal routing data (PLD) is checked and filtered, whereby data records that do not correspond to prescribed conventions are segregated and no longer taken into consideration. The encoding dictionary is then generated on the basis of the checked and filtered postal routing data (PLD)

and, on the basis of this encoding dictionary, the delivery addresses are encoded in the encoding installations of the distribution center in a manner generally known to the person skilled in the art.

The IBIS system shown in FIG. 1 is responsible for the generation and the maintenance of delivery district data (ZBEZ). In particular, the association of delivery addresses with various administrative and organizational units of the postal service provider that are relevant for the delivery of mailpieces is carried out in the IBIS system. These units are the data objects maintained within the IBIS system.

A street address is a route point of a delivery route. A route position is associated within the IBIS system to a delivery section that, in turn, is associated with a delivery district. The street addresses or delivery sections that are combined into a delivery district receive their mail from one single mail carrier.

Within the IBIS system, each delivery district is being associated with a delivery depot, whereby as a rule, the delivery depots are branch offices of the postal service provider where the mail carriers pick up the mailpieces they are to deliver and where they prepare their delivery routes.

Within the IBIS system, several delivery depots are associated with so-called delivery depots with a routing function, and these are delivery depots from which mailpieces are distributed among the additional delivery depots associated with them.

The delivery depots with a routing function, in turn, receive the mailpieces from a distribution center of the postal service provider, whereby delivery depots with a routing function within the IBIS system are each being associated with a distribution center.

The MOVE system shown in FIG. 1 is the system that is provided for generating the above-mentioned sorting lists and the information carrier data.

The basis for the generation of the sorting lists is the edited postal routing data that the CWMS system makes available to the MOVE system as well as the delivery district data that the MOVE system receives from the IBIS system. Moreover, delivery sequence compilation data (GV) is used in order to generate the sorting lists, in which the provided delivery sequence compilations are indicated that each comprise one or more delivery districts for which the delivery sequence sorting is carried out in a machine incoming feed. The delivery sequence compilation data (GV) is either generated and maintained within the MOVE system or else transferred to the MOVE system by another system not shown in FIG. 1.

It is preferably provided that the MOVE system is a central system that, however, makes available application programs for generating sorting lists that can be controlled from the distribution centers and that are preferably configured as so-called Web services. Within the scope of the MOVE system, the sorting lists and the information carrier data are generated in the following manner:

First of all, the sorting lists for the incoming sorting within the distribution centers of the postal service provider are generated using the application programs configured as Web services, or else existing sorting lists are adapted. These sorting lists are transmitted to the central system. Once this has been done, the sorting plans for the outgoing sorting in the individual distribution centers are generated within the scope of the central system, whereby the sorting destinations that are to be taken into consideration in the outgoing sorting are obtained especially from the machine incoming feeds provided for the incoming sorting. The information carrier data is then generated on the basis of the generated sorting lists and existing information carrier data is adapted to changed sorting lists.

The sorting lists and information carrier data generated in the MOVE system are finally combined to form so-called plan collections that are transmitted to the distribution centers of the postal service provider, as can be seen in FIG. 1.

Moreover, the plan collections (PLS) of the MOVE system are transmitted to the PPS system, which here especially requires the information carrier data. The PPS system is divided into a central component as well as several decentralized components which are each located in a distribution center of the postal service provider.

The decentralized components of the PPS system each combine mail volumes that are accumulated for the existing traffic streams during the sorting of the mailpieces of the sorting machines. A traffic stream comprises the mailpieces that are forwarded from a distribution center to a certain sorting destination such as, for example, another distribution center, a delivery depot or one or more delivery districts, whereby mailpieces for a sorting destination are diverted into one or more compartments of a sorting machine, so that one or more sorting compartments are associated with a traffic stream. The mail volumes accumulated in the traffic streams are determined on the basis of machine telegrams that, after a sorting run has been carried out by a sorting machine, are transmitted to the decentralized component of the PPS system within the appertaining distribution center. The machine telegrams contain not only an identification of the sorting machine and of the sorting program that has been carried out, but also information about the mail volumes that have been diverted into the various sorting compartments of the sorting machine.

The determination of the traffic streams themselves as well as the association of the sorting compartments with the traffic streams are carried out within the PPS system especially on the basis of the information carrier data received by the MOVE system, said information carrier data indicating the associations between the sorting compartments and the sorting or transportation destinations.

In order to determine and evaluate the traffic streams within the PPS system, additional information, that goes beyond the information carrier data is needed about the sorting destinations that likewise has to be made available to the PPS system.

Thus, for example, information carriers for sorting compartments into which mailpieces addressed with a mailing campaign postal code are diverted do not indicate that this postal code is a mailing campaign postal code since this is not relevant for the sorting and the transportation of the mailpieces. Only the transportation destination for these mailpieces is indicated. The information as to whether a mailing campaign postal code is present, however, is essential for the generation and evaluation of the traffic streams and thus has to be made available to the PPS system in some other way.

Another system for evaluating the mail volumes accumulated during the sorting is the VMIZ system shown in FIG. 1 to which the plan collections (PLS) or the information carrier data are likewise transmitted by the MOVE system. Within the VMIZ system, an evaluation of the accumulated mail volume is carried out with a view towards the traffic volumes that occur in the delivery. In particular, it is provided that the number of mailpieces delivered by each of the mail carriers is ascertained. On the basis of an evaluation, delivery districts can be changed with an eye towards distributing the work load of the mail carriers as uniformly as possible. Moreover, on the basis of the evaluation, existing delivery districts are divided into several new delivery districts or combined to form a new delivery district if it is ascertained that certain mail carriers are delivering an especially large or especially small amount of mail.

When it comes to the data stream shown with reference to FIG. 1, the problem arises that all of the data that is needed for the evaluation of the mail volumes in the PPS and VMIZ systems and that is maintained in the POINT and IBIS systems has to be made available to the POINT and IBIS systems, which until now, was done via the "in-between" MOVE and CWMS systems.

However, this is disadvantageous because some of the data consists of attributes of sorting destinations that are not needed in the CWMS and POINT systems. Moreover, there is a risk that data inconsistencies can occur during the data transmission among various systems and consequently that errors can occur during the processing and evaluation of the data. Furthermore, the drawback exists that the data only becomes available in the PPS and VMIZ systems once a plan collection has been completely generated and provided by the MOVE system.

Therefore, within the scope of the invention, it is provided that the data objects processed in the various described systems are each provided with an unambiguous identifier that will be referred to below as a RIO-ID. An association between the RIO-IDs, the designations of the data objects as well as their attributes is stored in a definition list and made available to the systems that process the data objects.

The transmission of results of the processing of a data object from a first system to a second system is carried out according to an exemplary embodiment of the present invention while indicating only the RIO-ID of the processed data objects within the processing result. The attributes associated with the data object are ascertained by the system that receives the processing result on the basis of the definition list.

The RIO-ID is an identifier of the data objects that remains unambiguous at least over a very long period of time, that is to say, it is a so-called UUID (Universally Unique Identifier) or a GUID (Globally Unique Identifier). Typically, it is ensured here that such an identifier unambiguously identifies the appertaining data object for a period of time of about 1500 years.

Preferably, the RIO-ID is configured as a code with 16 bytes (32 characters) that is made up of an identifier of the data processing system that generates the data object or the RIO-ID, as well as of an identifier of the generating data processing process. Functions for generating such identifiers are known to the person skilled in the art and, as a rule, are provided by conventional database systems. The RIO-ID of Darmstadt, Germany, is C0DA5AC564535BEFE034080020E1D96B, for example.

Figure 2:
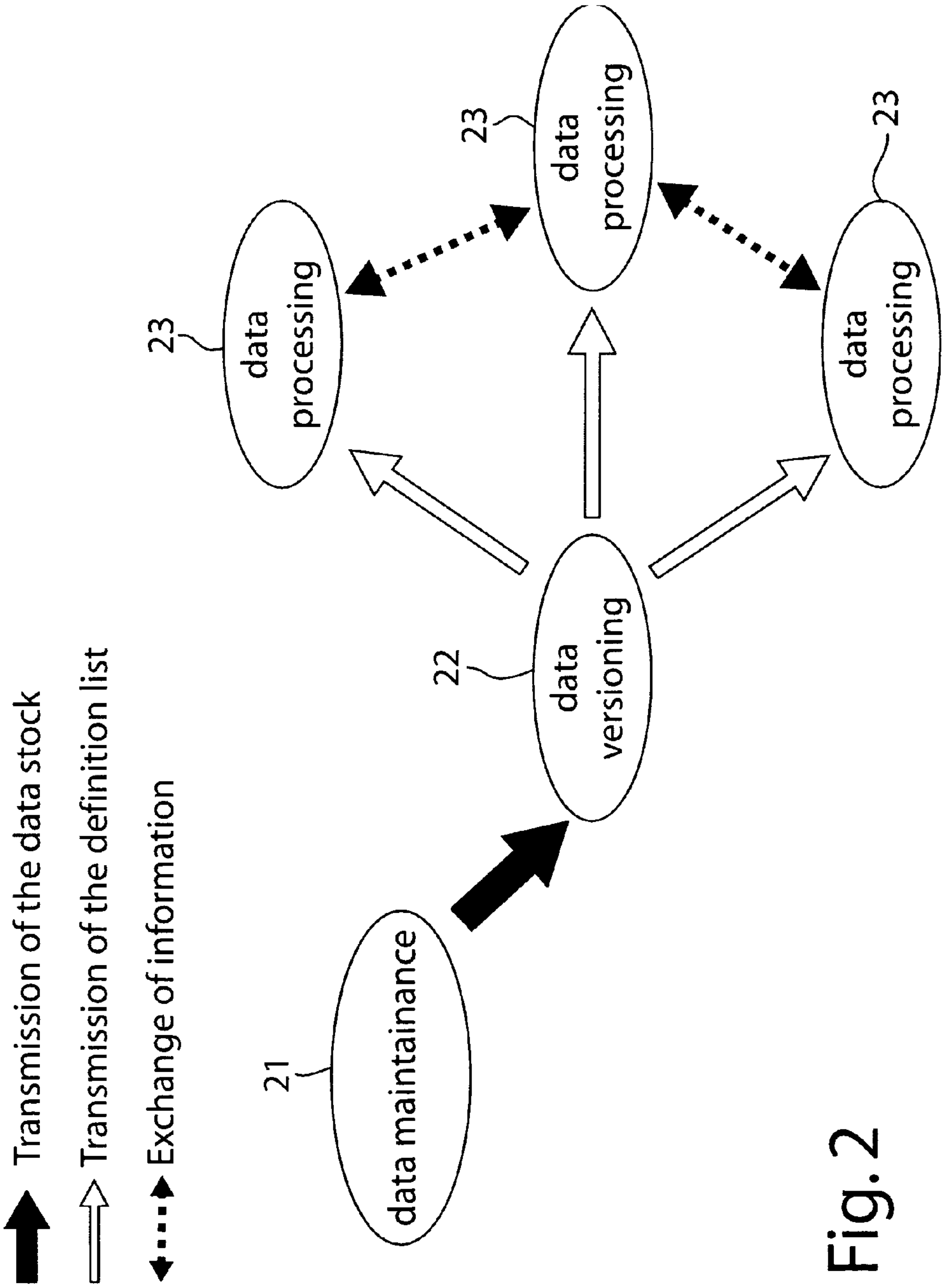
FIG. 2 is a diagram illustrating the data exchange between a maintenance system, a versioning system and several data processing systems in accordance with an exemplary embodiment of the present invention.

The provision of the definition lists as well as the data exchange between the systems that use the definition lists are schematically shown in FIG. 2, which will be discussed below.

Within the scope of the invention, it is provided that each data object is associated with exactly one data processing system 21 that has maintenance autarchy for this data object. The generation and deletion of a data object and of the appertaining RIO-ID as well as the data maintenance, that is to say, especially the adaptation of attributes of the data object, all take place exclusively in this system 21, which is also referred to below as a maintenance system.

Definition lists containing an association between the RIO-IDs and the associated data objects along with their attributes are generated on the basis of the status of the data stock of the maintenance system 21 that is present at a given point in time. This procedure is also referred to as versioning and it is carried out in a data processing system 22 that has versioning autarchy for the data objects and that is also referred to below as a versioning system.

In this context, each data object is associated with exactly one versioning system 22. Here, it can be provided that the maintenance system 21 likewise has versioning autarchy over the data objects that it maintains. By the same token, however, it can also be provided that another data processing system 22 has versioning autarchy over the data, as is shown in FIG. 2. For versioning purposes, this system is provided with the data stock of the maintenance system 21, as is illustrated in FIG. 2 by the solid black arrow.

Particularly if the data objects maintained in a data processing system 21 are checked or filtered in a second data processing system, it is advantageous for the versioning to be carried out only after the checking or filtering and for the versioning autarchy over the data objects to be associated with the second system.

In an embodiment of the invention, a versioning is carried out when this becomes necessary due to changes within the data stock of the system 21 with maintenance autarchy. This can be the case, for example, if the changes exceed a given number and/or have a prescribed relevance. Moreover, the versioning can also take place at regular time intervals. The time span from the generation of a definition list until the generation of an updated definition list is referred to as the versioning cycle.

In order to be able to distinguish the definition lists generated during different consecutive versioning procedures from each other, each definition list is provided with a version number. In this manner, in order to indicate the attributes of data objects within a versioning cycle, in addition to the current definition list, an older definition list is also consulted.

Within the scope of the invention, the versioning can be carried out or initiated manually, whereby an operator of the system 21, 22 with maintenance or versioning autarchy decides about the point in time of the generation of a definition list. By the same token, the versioning can also be triggered automatically.

In particular, for example, it can be provided that the entire current data stock of the maintenance system or the data stock in which a change has been made is transmitted at regular time intervals from the maintenance system 21 to the versioning system 22 and that, within the scope of the versioning system 22, a decision is made as to whether a new definition list is generated or whether the existing definition list is retained, as a function of the number of changes or relevance of the changes made in the data stock.

In another embodiment, it can also be provided that the entire current data stock of the maintenance system 21 or of the data stock of this system in which a change was made is transmitted as a function of the number of changes or relevance of the changes, and that, within the scope of a versioning, in each case, a new definition list is generated when the data stock is received in the versioning system 22.

The provision of the definition lists for the data processing systems 23 is preferably carried out by the versioning system 22. Here, it can be provided that the versioning system 22 transmits definition lists to the data processing systems 23 at the time of each versioning within the scope of a push-oriented transmission method or that the definition lists or some of the definition lists are requested by the data processing systems 23. FIG. 2 shows the transmission of the definition list from the versioning system 22 to the data processing systems 23 using arrows that are not filled in.

The exchange of information between the data processing systems 23 is carried out on the basis of the RIO-IDs of the data objects and on the basis of the version number of the pertinent definition list. A result of the processing of a data object that is generated in a first data processing system 23 and that is provided for further processing in a second data processing system 23 is transmitted from the first data processing system 23 to the second data processing system 23, along with an indication of its RIO-ID and the version number of the pertinent definition list. The attributes of the data object needed within the second data processing system 23 in order to further process the processing result are then ascertained within the second data processing system 23 on the basis of the definition list with the indicated version number.

In one embodiment of the invention, it can also be provided that the second data processing system 23 requests merely a relevant part of the definition list from the versioning system 22. In particular, it can be provided that the second data processing system requests from the versioning system merely the attributes of the appertaining data object that is provided for further processing, for which purpose it transmits a query to this effect, indicating the RIO-ID of the data object as well as the version number of the pertinent definition list to the versioning system 22. Then, in response to this query, a message containing the attributes is sent from the versioning system to the second data processing system 23.

Figure 3:
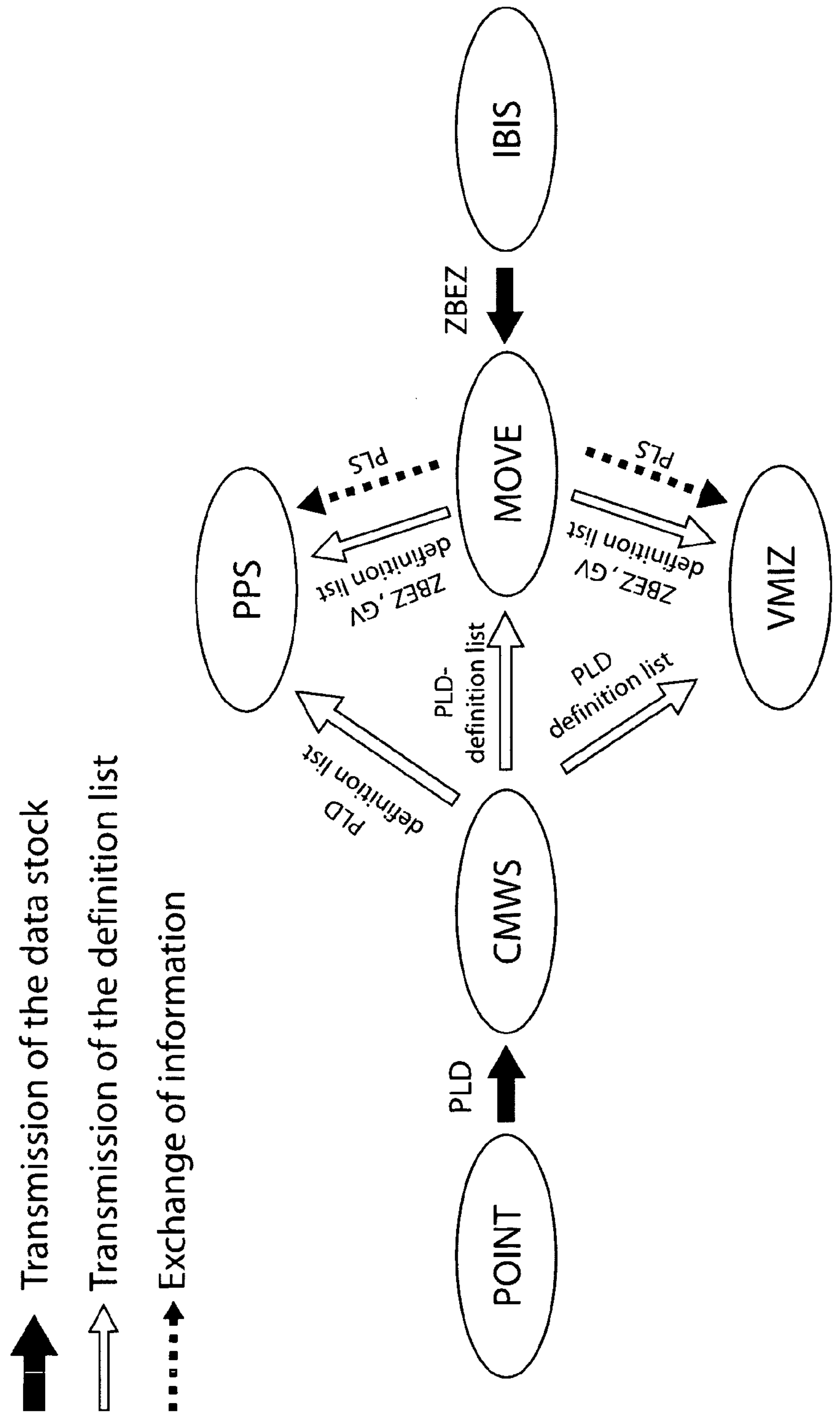
FIG. 3 is a diagram showing the data exchange provided according to an exemplary embodiment of the present invention between the systems for making available and evaluating data that is relevant for the sorting of mailpieces.

FIG. 3 shows a diagram illustrating the data exchange that takes place on the basis of this principle between the already described data processing systems for maintaining postal routing data (PLD) as well as delivery district data (ZBEZ), for generating sorting lists and plan collections (PLS) containing information carrier data and for evaluating the mail volumes accumulated during the sorting of the mailpieces.

The POINT system is the maintenance system for the already described postal routing data (PLD). In particular, each data object that is a component of the postal routing data (PLD) is associated with a RIO-ID within the POINT system. The RIO-ID is generated during the creation of a data object. If the attributes of data objects are changed, the RIO-ID is retained. When the associated data object is deleted, the RIO-ID is likewise deleted.

The POINT system transmits the postal routing data (PLD) to the CWMS system which, as already explained above, first checks and filters the data and generates encoding dictionaries on the basis of the checked and filtered postal routing data. Moreover, the versioning of the postal routing data (PLD) is also carried out in the CWMS system, whereby a PLD definition list is generated that contains an association between the data objects comprised in the postal routing data (PLD) or their attributes that are and the RIO-IDs associated with the data objects. In one embodiment of the invention, the PLD definition list is then transmitted to the MOVE, PPS and VMIZ systems, which process the postal routing data (PLD). In another embodiment of the invention, it is provided that some or all of these systems request the definition list from the CWMS system.

The IBIS system is provided as the maintenance system for the delivery district data (ZBEZ). Within this system, each data object comprised by the delivery district data is associated with a RIO-ID. Preferably, the RIO-ID is generated during the creation of a data object and it is, in turn, not changed when the attributes of the data object change. However, if a data object comprised by the delivery district data (ZBEZ) is deleted, then the associated RIO-ID is likewise deleted.

At regular time intervals, the IBIS system transmits the delivery district data (ZBEZ) to the MOVE system which, in the embodiment of the invention shown in FIG. 3, is the versioning system for the delivery district data (ZBEZ). After the delivery district data has been received, the versioning of the ZBEZ is carried out in the MOVE system, whereby a ZBEZ definition list that stores the association between the data objects comprised by the delivery district data (ZBEZ) or their attributes and the RIO-IDs that have been associated with the data objects by the IBIS system. The ZBEZ definition list is then transmitted to the PPS and VMIZ systems, or else the PPS and VMIZ systems request the ZBEZ definition list from the MOVE system.

Moreover, the MOVE system is provided as the versioning system for the delivery sequence compilation data (GV) that is either generated and maintained in the MOVE system itself, or else that is transmitted to said MOVE system by a maintenance system (not shown in FIG. 3). Here, the GV definition lists generated in the MOVE system for the delivery sequence compilation data are likewise transmitted to the PPS and VMIZ systems.

Moreover, the sorting lists and information carrier data for the sorting of mailpieces in the distribution centers, which are not shown in FIG. 3, are generated within the MOVE system on the basis of the delivery district data (ZBEZ), the postal routing data (PLD) as well as the delivery sequence compilation data (GV). The generation of the sorting lists is carried out here in the same manner as described above. However, in addition to the above-mentioned information, the RIO-IDs of the transport destinations as well as the RIO-IDs of the sorting destinations for which mailpieces have been diverted into the sorting compartments are incorporated into the information carrier data. If, for example, mailpieces for several delivery districts are to be diverted into on sorting compartment and if all of the mailpieces diverted into the sorting compartment are to be transported to a prescribed delivery depot, then the appertaining information carrier data contains the RIO-ID of the delivery depot that represents the transport destination as well as the RIO-IDs of the delivery districts that represent the sorting destinations for which mailpieces have been diverted into the sorting compartment.

The plan collection (PLS) generated in the MOVE system, comprising the sorting lists and the information carrier data, is then transmitted to the PPS and IBIS systems. The attributes of the data objects taken into account in the sorting plans and in the information carrier data do not have to be transmitted to the PPS and IBIS systems in this case. Within the scope of the PPS and VMIZ systems, these attributes are obtained from the PLD and ZBEZ definition lists that were transmitted from the MOVE system as well as from the CWMS system.

The definition lists for the postal routing data (PLD), for the delivery district data (ZBEZ) and for the delivery sequence compilation data (GV) are already available immediately after the versioning of this data before a plan collection is received. As a result, the transportation and sorting destinations that are taken into consideration within the plan collection can be integrated into the PPS and VMIZ systems already before the plan collection has been received.

The traffic streams that could possibly arise during the processing of the mailpieces can already be ascertained during the integration of the data into the PPS system; for this purpose, it is necessary to know the transportation and sorting destinations that are taken into consideration during the sorting.

Then, when the plan collection is received, on the basis of the information carrier data, the association provided during the sorting between the transportation and sorting destinations and the sorting compartments of the sorting machines is stored in these systems so that the determination of the traffic streams can be made in the manner described above.

What is claimed is:

1. A method for generating sorting lists for sorting mailpieces or evaluating of mail volume accumulated during the sorting of mailpieces, in the method data objects that are relevant for the sorting of the mailpieces being processed, and a result of the processing of a data object in a first data processing system being transmitted to a second data processing system for further processing, the method comprising:

providing in the first and second data processing system a definition list that contains associations between the data objects and an unambiguous identifier and in which attributes of the data objects are indicated, the unambiguous identifier of the data object being contained in the result of the processing of the data object;

the second data processing system ascertaining the attributes of the data object from the definition list on the basis of the identifier and carries out the further processing of the result of the processing of the data object in the first data processing system on the basis of the ascertained attributes, such that the attributes of the data object required for the further processing do not have to be transmitted from the first data processing system to the second data processing system; and associating each data object with a data processing system with versioning autarchy in which the definition list with the association between the data object and the identifier is generated and which makes the definition list available to the first and second data processing system.

2. The method according to claim 1, comprising:

generating a further definition list in the data processing system with versioning autarchy when the attributes of at least one data object change; and making the further definition list available to other data processing systems.

3. The method according to claim 1, comprising:

generating a further definition list in the data processing system with versioning autarchy at regular time intervals; and making the further definition list available to other data processing systems.

4. The method according to claim 1, comprising providing the definition list with a version identifier that is unambiguously associated with it.

5. The method according to claim 4, wherein the version identifier is contained in the result of the processing of the data object in the first data processing system.

6. The method according to claim 5, wherein the second data processing system ascertains the definition list from a plurality of definition lists on the basis of the version identifier.

7. The method according to claim 1, comprising sending the definition list from the data processing system with versioning autarchy to the other data processing systems.

8. The method according to claim 1, comprising requesting by the other data processing systems at least part of the definition list from the data processing system with versioning autarchy.

9. The method according to claim 1, comprising:

requesting by the second data processing system the attributes of the data object contained in the definition list from the data processing system with versioning autarchy; and transmitting by the second data processing system the identifier contained in the result of the processing of the data object in the first data processing system to the data processing system with versioning autarchy.

10. The method according to claim 1, wherein each data object is associated with a data processing system with maintenance autarchy which generates the data object as well as the identifier of the data object and which associates the appertaining attributes with the data object.

11. The method according to claim 10, wherein the data processing system with maintenance autarchy and the data processing system with versioning autarchy are identical.

12. The method according to claim 10, comprising transmitting from the data processing system with maintenance autarchy the data objects along with their associated identifier to the data processing system with versioning autarchy.

13. The method according to claim 1, comprising:

checking by the data processing system with versioning autarchy the data object; and generating the definition list after having checked the data object successfully.

14. The method according to claim 1, comprising generating by the first data processing system information carrier data on the basis of data objects that are indicated in a definition list and that describe transportation destinations, the information carrier data containing an association between a sorting compartment of a sorting machine and an identifier that is associated with a transportation destination on the basis of the definition list.

15. The method according to claim 14, ascertaining in the second data processing system, a number of mailpieces that are taken to the transportation destination, whereby an indication of the number of mailpieces sorted into the sorting compartment by the sorting machine is made available to the second data processing system and whereby the evaluation system ascertains the transportation destination on the basis of the information carrier data and the definition list.

16. The method according to claim 14, comprising:

ascertaining by the second data processing system the transportation destination; and associating, on the basis of the definition list, the transportation destination that corresponds with the identifier contained in the information carrier data is ascertained.

17. A system for generating sorting lists for sorting mailpieces or evaluating of mail volume accumulated during the sorting of mailpieces, the system comprising:

data processing systems for generating and/or processing data objects that are relevant for the sorting of the mailpieces, a result of the processing of a data object in a first data processing system being transmittable to a second data processing system for further processing, and in the data processing systems a definition list being available, the definition list containing associations between the data objects and an unambiguous identifier and in which attributes of the data objects are indicated;

whereby the unambiguous identifier of the data object is contained in the result of the processing of the data object, and whereby in the second data processing system, the attributes of the data object can be ascertained from the definition list on the basis of the identifier and the further processing of the result of the processing of the data object in the first data processing system can be carried out on the basis of the ascertained attributes such that the attributes of the data object required for the further processing do not have to be transmitted from the first data processing system to the second data processing system; and with each data object a data processing system with versioning autarchy is associated, in which the definition list with the association between the data object and the identifier is generated and which makes the definition list available to the first and second data processing systems.

18. A method for generating sorting lists for sorting mailpieces or evaluating of mail volume accumulated during the sorting of mailpieces, the method comprising:

providing in a first and a second data processing system a definition list that contains an association between a data object and an identifier and in which attributes of the data object are indicated, wherein the definition list is associated with a version number;

processing the data object in the first data processing system and transmitting a first result of the processing from the first data processing system to the second processing system, the identifier of the data object and the version number of the definition list being contained in the first result;

in the second data processing system, ascertaining the attributes of the data object from the definition list on the basis of the identifier and the version number of the definition list and performing further processing of the first result based on the ascertained attributes, such that the attributes of the data object required for the further processing do not have to be transmitted from the first data processing system to the second data processing system; and associating the data object with a data processing system with versioning autarchy in which the definition list with the association between the data object and the identifier is generated and which makes the definition list available to the first and second data processing system.

* * * * *